(12) United States Patent
Tamura

(10) Patent No.: US 9,190,645 B2
(45) Date of Patent: Nov. 17, 2015

(54) ON-BOARD BATTERY ASSEMBLY

(75) Inventor: Hiroshi Tamura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 958 days.

(21) Appl. No.: 12/585,739

(22) Filed: Sep. 23, 2009

(65) Prior Publication Data

US 2010/0075206 A1 Mar. 25, 2010

(30) Foreign Application Priority Data

Sep. 24, 2008 (JP) .................................. 2008-244845

(51) Int. Cl.

| H01M 10/65 | (2014.01) |
|---|---|
| H01M 2/10 | (2006.01) |
| H01M 10/48 | (2006.01) |
| H01M 10/625 | (2014.01) |
| H01M 10/615 | (2014.01) |
| H01M 10/6563 | (2014.01) |
| H01M 10/647 | (2014.01) |
| H01M 10/6556 | (2014.01) |
| H01M 10/6571 | (2014.01) |
| H01M 10/6551 | (2014.01) |
| H01M 10/652 | (2014.01) |
| H01M 10/6566 | (2014.01) |
| H01M 10/613 | (2014.01) |

(52) U.S. Cl.
CPC .......... *H01M 2/1083* (2013.01); *H01M 2/1077* (2013.01); *H01M 10/486* (2013.01); *H01M 10/613* (2015.04); *H01M 10/615* (2015.04); *H01M 10/625* (2015.04); *H01M 10/647* (2015.04); *H01M 10/652* (2015.04); *H01M 10/6551* (2015.04); *H01M 10/6556* (2015.04); *H01M 10/6563* (2015.04); *H01M 10/6566* (2015.04); *H01M 10/6571* (2015.04)

(58) Field of Classification Search
None
See application file for complete search history.

(56) References Cited

U.S. PATENT DOCUMENTS 5,392,873 A * 2/1995 Masuyama et al. .......... 180/68.5
5,534,364 A   7/1996 Watanabe et al.
(Continued)

FOREIGN PATENT DOCUMENTS

JP   A-7-14564      1/1995
JP   A-2000-228178  8/2000
(Continued)

OTHER PUBLICATIONS

U.S. Appl. No. 12/384,170, filed Apr. 1, 2009 in the name of Inoue.
(Continued)

*Primary Examiner* — Ula C Ruddock
*Assistant Examiner* — Frank Chernow
(74) *Attorney, Agent, or Firm* — Oliff PLC

(57) ABSTRACT

An on-board battery assembly includes a cell stack, a blowing member, and a control component. The cell stack includes a plurality of cell modules. The cell stack has one side face that extends generally along a width axis orthogonal to a longitudinal axis of the plurality of cell modules. The blowing member having a blow-out port that has a dimension generally equivalent to a dimension of the one side face. The blowing member includes a casing having a suction port and a flow channel. The flow channel has a width that becomes greater toward the blow-out port. The control component is provided in a space defined between the casing and a plane, which is perpendicular to the width axis, and which includes an end portion of the one side face.

7 Claims, 6 Drawing Sheets

(56) References Cited

U.S. PATENT DOCUMENTS

| | | | |
|---|---|---|---|
| 6,472,098 B1 | 10/2002 | Sawada et al. | |
| 6,632,560 B1* | 10/2003 | Zhou et al. | 429/99 |
| 6,662,891 B2* | 12/2003 | Misu et al. | 180/68.1 |
| 8,042,637 B2* | 10/2011 | Nagata et al. | 180/68.5 |
| 2006/0210868 A1* | 9/2006 | Kim et al. | 429/120 |
| 2006/0216582 A1* | 9/2006 | Lee et al. | 429/120 |
| 2006/0259817 A1 | 11/2006 | Kawai et al. | |
| 2007/0267917 A1* | 11/2007 | Puschkat | 307/10.1 |
| 2008/0119066 A1* | 5/2008 | Shimizu et al. | 439/76.1 |
| 2008/0136368 A1* | 6/2008 | Hajiaghajhani | 320/106 |
| 2008/0247135 A1 | 10/2008 | Inoue et al. | |
| 2009/0253029 A1* | 10/2009 | Inoue | 429/71 |

FOREIGN PATENT DOCUMENTS

| | | |
|---|---|---|
| JP | A-2002-157982 | 5/2002 |
| JP | A-2003-346759 | 12/2003 |
| JP | A-2006-248431 | 9/2006 |
| JP | A-2006-310056 | 11/2006 |
| JP | A-2008-234870 | 10/2008 |
| JP | A-2008-234936 | 10/2008 |
| JP | A-2008-257960 | 10/2008 |

OTHER PUBLICATIONS

Notification of Reason(s) for Refusal dated Jan. 29, 2013 from Japanese Patent Application No. 2008-244845 (with English-language translation).

* cited by examiner

US 9,190,645 B2

ON-BOARD BATTERY ASSEMBLY

CROSS REFERENCE TO RELATED APPLICATION

This application is based on and incorporates herein by reference Japanese Patent Application No. 2008-244845 filed on Sep. 24, 2008.

BACKGROUND OF THE INVENTION

1. Field of the Invention

The present invention relates to an on-board battery assembly serving as a drive power source for a vehicle travel motor.

2. Description of Related Art

A conventional on-board battery assembly is known as an apparatus described in JP-A-2003-346759, for example. The on-board battery assembly includes a cell stack, an air blower, and various control components. The cell stack includes multiple cells, and the air blower supplies cooling air to the cell stack. The various control components are related to the cell stack and the air blower.

Recently, the on-board battery assembly has been further required to be reduced in size because, for example, the on-board battery assembly is mounted in a boot of a hybrid electric vehicle, which has a limited mounting space. Although the on-board battery assembly described in JP-A-2003-346759 is made by integrating the cell stack, the air blower, and the various control components, the size of the whole apparatus is not reduced substantially. Thus, the apparatus is susceptible to the further improvement through study of the arrangement of the components.

SUMMARY OF THE INVENTION

The present invention is made in view of the above disadvantages. Thus, it is an objective of the present invention to address at least one of the above disadvantages.

To achieve the objective of the present invention, there is provided an on-board battery assembly that includes a cell stack, a blowing member, and a control component. The cell stack includes a plurality of cell modules, which is electrically connected in series with each other. Each of the plurality of cell modules has a side surface that extends along a longitudinal axis of each of the plurality of cell modules. The plurality of cell modules is integrally arranged such that the side surfaces of the plurality of cell modules are opposed to each other along a width axis that is orthogonal to the longitudinal axis. The cell stack has one side face that extends generally along the width axis. The blowing member is provided adjacent the one side face of the cell stack. The blowing member having a blow-out port that has a dimension generally equivalent to a dimension of the one side face of the cell stack measured along the width axis. The blowing member supplies cooling air to the cell stack through the blow-out port. The control component is electrically connected with the plurality of cell modules. The control component is adapted to control electric power supply from the cell stack. The blowing member includes a casing that has a suction port and a flow channel. The suction port is adapted to suction air generally in a direction of the width axis. The flow channel is defined within the casing. The flow channel connects the suction port with the blow-out port. The flow channel has a dimension along the width axis, which becomes greater toward the blow-out port. The control component is provided in a space defined between the casing and a plane, which is perpendicular to the width axis, and which includes an end portion of the one side face of the cell stack along the width axis.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One Embodiment

An on-board battery assembly of the one embodiment of the present invention is employed for a known hybrid electric vehicle that is driven by a travel power source that is a combination of an internal combustion engine and an electric powered motor, and the on-board battery assembly cools the battery that serves as a drive power source of the travel motor. The battery may be, for example, a nickel-metal hydride secondary battery, a lithium ion secondary battery, or an organic radical battery. The battery may be receive in a casing and may be mounted in a space below the seat of the vehicle, or in a space between a rear seat and a boot (a luggage compartment), or in a space between the driver seat and the front passenger seat.

Figure 1:
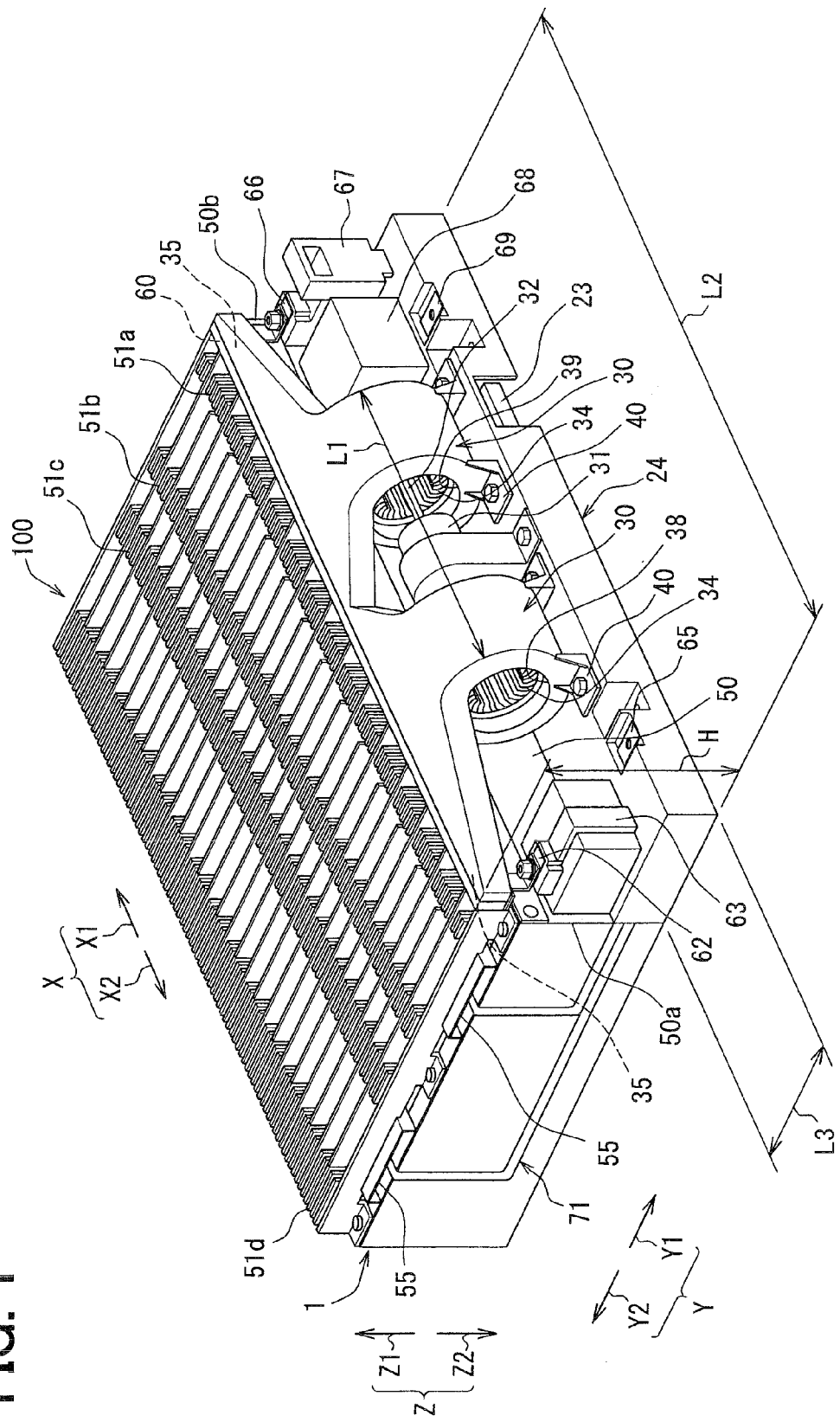
FIG. 1 is a perspective view for explaining a general configuration of an on-board battery assembly according to one embodiment of the present invention.
Figure 2:
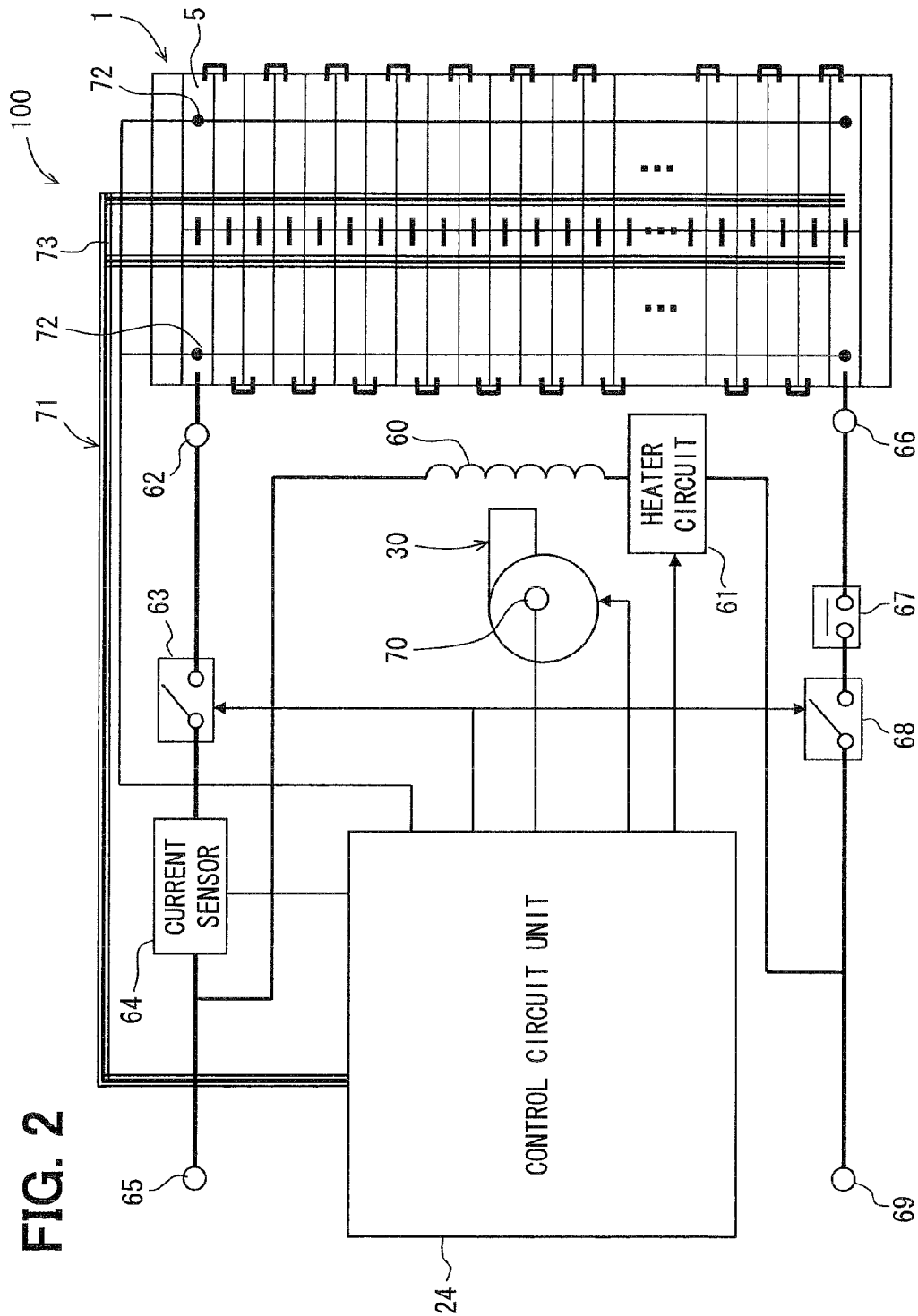
FIG. 2 is a diagram for explaining a control of the on-board battery assembly.
Figure 3:
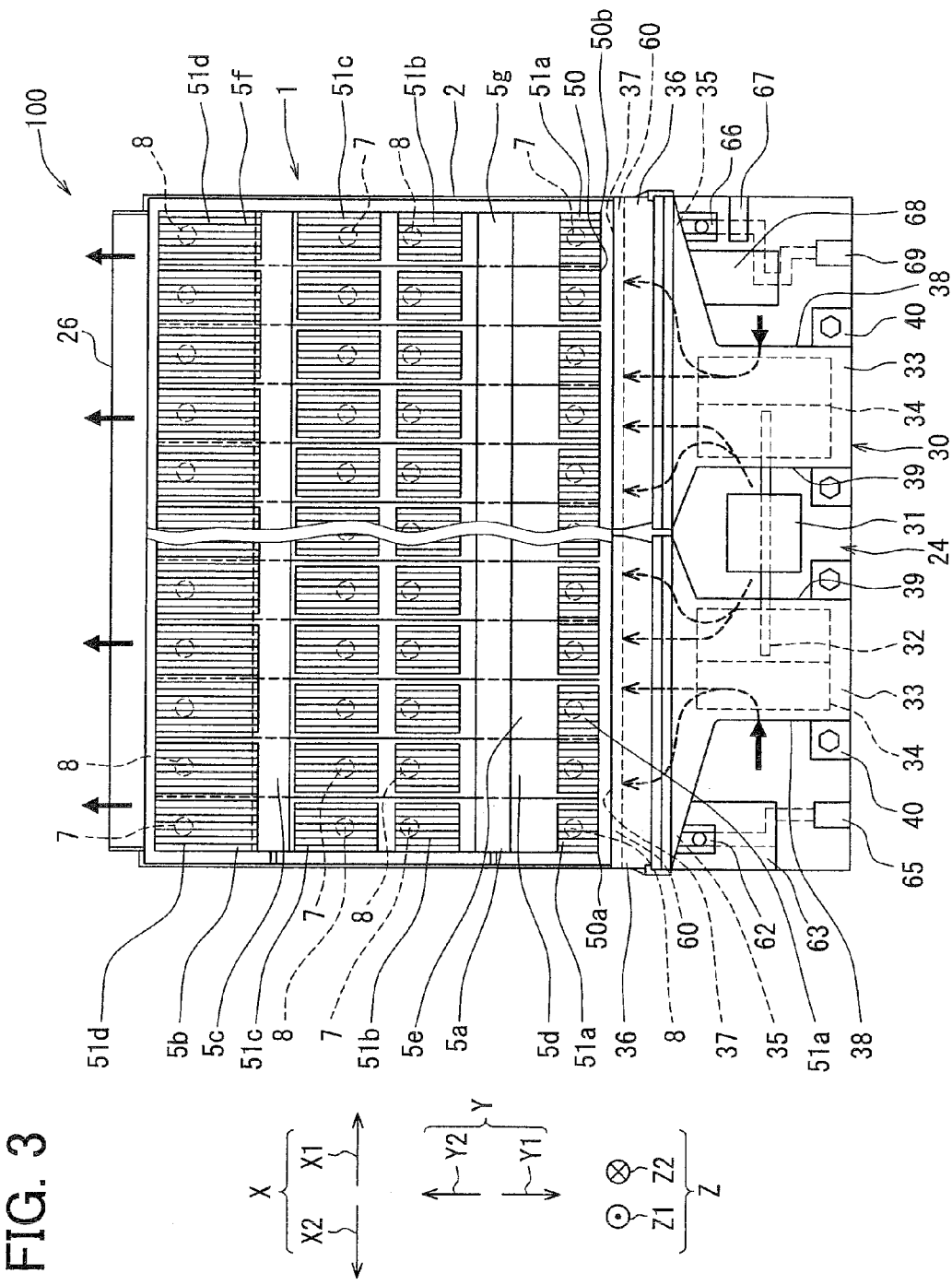
FIG. 3 is a plan view of a general configuration of the on-board battery assembly for illustrating a configuration of a cell stack received in a casing, and flow of cooling air.
Figure 4:
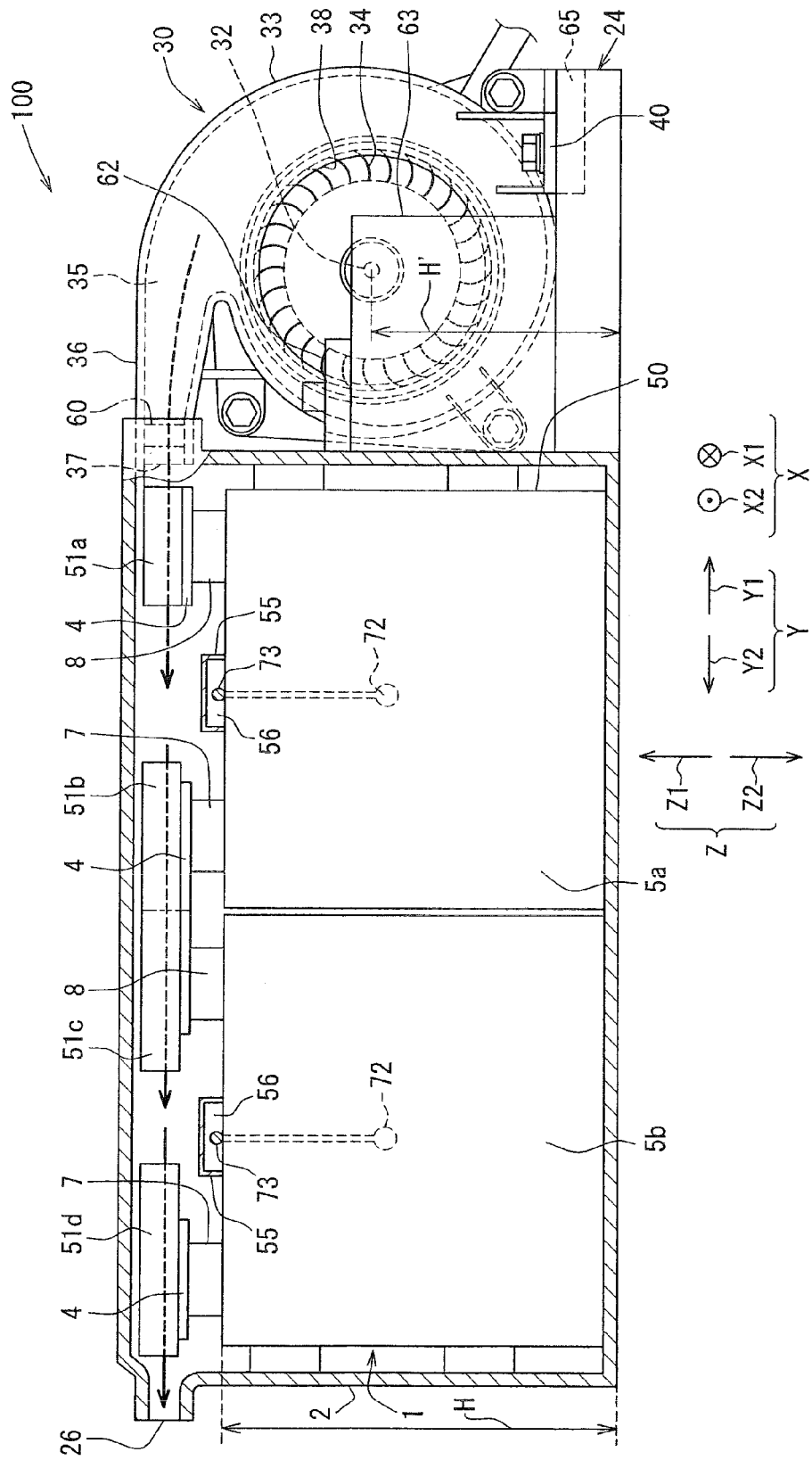
FIG. 4 is a side view of the general configuration of the on-board battery assembly for illustrating a configuration of the cell stack received in the casing and the flow of cooling air.

The one embodiment of the present invention will be described with reference to FIGS. 1 to 6. FIG. 1 is a perspective view for explaining a general configuration of an on-board battery assembly 100 of the present embodiment. FIG. 2 is a diagram for explaining a control of the on-board battery assembly 100. FIG. 3 is a plan view of a general configuration of the on-board battery assembly 100 for illustrating a configuration of a cell stack 1 received in a casing 2 and flow of cooling air. FIG. 4 is a side view of the general configuration of the on-board battery assembly 100 for illustrating a configuration of the cell stack 1 received in the casing 2 and the flow of cooling air. In each drawing, a longitudinal axis Y (or depth axis Y) defines a direction, in which a rectangular parallelepiped shape of each cell module 5 (cell module 5a, 5b, 5c, etc) extends. A width axis X is orthogonal to the longitudinal axis Y. Also, a height axis Z (or an up-down axis Z) is perpendicular to both the longitudinal axis Y and the width axis X.

As shown in FIG. 1, the on-board battery assembly 100 mainly includes the cell stack 1, a blowing member 30, and a control component. The cell stack 1 is a module assembly that is assembled by multiple cell modules 5. The blowing member 30 supplies air for cooling the cell stack 1. The control component is electrically connected with the multiple cell modules 5 and is used for controlling electric power supply from the cell stack 1. The cell stack 1, the blowing member 30, and the control component are integrated to make a battery or a battery pack, which is mounted on the vehicle. More specifically, the cell stack 1 has multiple cell modules that are electrically serially connected with each other. The multiple cell modules are arranged such that a side surface, which extends along the longitudinal axis Y, of each of the multiple cell modules is opposed to the side surface of the adjacent cell module. The cell stack 1 is made by integrating the multiple cell modules and is received in the casing 2.

The casing 2 is a rectangular parallelepiped case that has at least one detachable surface for maintenance use, and is made of a resin or a steel plate. The casing 2 has a component receiving box and an attachment portion that is used for fixing the casing 2 with a part of the vehicle by bolts. The component receiving box receives therein a control circuit unit 24, and wire harness. The control circuit unit 24 includes a battery monitor unit and a control circuit. The battery monitor unit receives detection results from various sensors in order to monitor a battery condition (for example, voltage, temperature). The control circuit operates a drive control of a motor 31 of the blowing member 30 and operates a battery control. The wire harness connects each of the components. The control circuit unit 24 is a battery ECU that monitors a condition of the cell stack 1, and is connected with the cell stack 1 through a number of wires. The control circuit unit 24 is capable of communicating with an external electronic control device. Also, the control circuit unit 24 may be configured to give necessary commands to the electronic control circuit of the cell stack 1.

A configuration of control of the on-board battery assembly 100 will be described. A harness unit 71 detects a battery condition and includes monitor sensors 72 and wirings 73. Each of the monitor sensors 72 detect the battery condition of the respective cell module 5, and the wirings 73 transmit the signals from the monitor sensors 72 to the control circuit unit 24. The cell stack has one side face 50 that faces in a first longitudinal direction Y1 along the longitudinal axis (see FIG. 1). The cell stack 1 has a negative terminal 62 and a positive terminal 66 that are located near both longitudinal end portions 50a, 50b of the one side face 50, respectively.

Relay units 63, 68 (system main relays or SMR) serving as control relays for controlling electric power supply from battery are provided on an anode side and a cathode side of the cell stack 1, respectively. The relay units 63, 68 are provided between a travel motor and the cell stack 1. The relay unit 63 serves as the system main relay adapted to connect and disconnect a main electric current path of a lower-voltage side, and is electrically connected with the negative terminal 62. The relay unit 68 serves as the system main relay adapted to connect and disconnect a main electric current path of a higher-voltage side, and is electrically connected with the positive terminal 66. In other words, the relay units 63, 68 are controlled by the control circuit unit 24 such that the relay units 63, 68 are capable of allowing and prohibiting electric current supply to the cell stack 1. Also, both the relay units 63, 68 are synchronously turned on and off in order to allow and prohibit the electrical connection between the cell stack 1 and an electrical load.

A service plug 67 is provided between the positive terminal 66 and the relay unit 68. The service plug 67 is detachably insertable, and is detached during a maintenance service in order to break the main electric current path. The service plug 67 may be, for example, a service plug integral with an electric fuse. The on-board battery assembly has a negative terminal 65 and a positive terminal 69, which are connected with an apparatus that is an electric power receiver, such as the travel motor. The positive terminal 69 of the on-board battery assembly is connected with the relay unit 68. The negative terminal 65 of the on-board battery assembly is connected with the relay unit 63. An electric current sensor 64 is provided between the negative terminal 65 and the positive terminal 69, and is configured to detect electric current of the cell stack 1. The electric current signal detected by the electric current sensor 64 is sent to the control circuit unit 24 as a charging electric current or a discharging electric current.

The on-board battery assembly 100 has a heater member 60 that is provided in a passage, through which cooling air supplied by the blowing member 30 flows, and the heater member 60 heats the cooling air. The heater member 60 is connected with the negative terminal 65 and the positive terminal 69 of the on-board battery assembly. The electric power supplied to the heater member 60 is controlled by a heater control circuit 61 that receives control signals from the control circuit unit 24. A voltage difference between the both electrode terminals is controlled by the heater control circuit 61, and the voltage difference serves as an electric power supplied to the heater member 60. The heater control circuit 61 may be configured by, for example, a power transistor.

The control circuit unit 24 detects a rotational speed of a fan of the blowing member 30, and an intake air temperature sensor 70 detects temperature of air suctioned by the fan. The control circuit unit 24 executes computation based on the intake air temperature detected by the intake air temperature sensor 70, the cell temperature detected by the monitor sensor 72, and a prestored control program. The control circuit unit 24 adjusts the cooling of the battery by controlling a rotational speed of a fan 34 such that the battery temperature stays within an appropriate temperature range. Also, a driving operation of the motor 31 is controlled by the control circuit unit 24. The control circuit unit 24 executes a PWM control, in which, for example, a duty ratio (duty cycle) of a pulse wave of voltage is changed. For example, the control circuit unit 24 controls the rotational speed of the fan in accordance with a target cooling capacity through the PWM control such that temperature of the cell stack 1, which is detected by the temperature sensor, is controlled. The control circuit unit 24 is adapted to communicate with various control apparatuses of the vehicle through a communication line connected with a communication connector 23.

The positive terminal 69 of the on-board battery assembly, the positive terminal 66, the relay unit 68, and the service plug 67 are located on a first half section of the on-board battery assembly 100. The negative terminal 65 of the on-board battery assembly, the negative terminal 62, and the relay unit 63 are located on a second half section of the on-board battery assembly 100. For example, the first half section of the on-board battery assembly 100 is a half of the on-board battery assembly 100 in a first width direction X1 along the width axis X, and the second half section of the on-board battery assembly 100 is the other half of the on-board battery assembly 100 in a second width direction X2 opposite the first width direction X1 along the width axis X (see FIG. 3).

The control component of the present embodiment is electrically connected with multiple cell modules and includes various components used for controlling the energization of the cell stack 1. The control component of the present embodiment includes the relay unit 63 on the lower-voltage side, the relay unit 68 on the higher-voltage side, the service plug 67, the control circuit unit 24, the electric current sensor 64, and the heater control circuit 61.

Next, a physical relation of the cell modules 5a to 5g will be described with reference to FIGS. 3 and 4. The cell modules 5a to 5g may be referred as the cell modules 5. Each of the cell modules 5 has a flat rectangular parallelepiped shape and has an outer peripheral surface that is covered by an outer case made of an electrically insulating resin. Each cell module 5 has a positive terminal and a negative terminal separately located at longitudinal ends of the cell module 5. Both of the terminals projects from the outer case to be exposed to the exterior. Two cell modules 5 are arranged apart from each other by a predetermined clearance therebetween along the longitudinal axis Y within the casing 2. Thus-arranged pairs of two cell modules 5 are arranged in contact with each other along the width axis X in the casing 2 such that the pairs of two cell modules 5 occupy the casing 2. In other words, the pairs of two cell modules 5 are stacked onto one another along the width axis X.

All of the cell modules 5 located in the casing 2 are connected in series with each other through each of electrode parts 4 serving as electrically conductive members such that the connected cell modules forms a tortuous shape that goes back and forth within the casing 2 along the longitudinal axis Y. More specifically, the electrically connected cell modules begins from a position of a negative terminal 8 of the first cell module 5a located on the second width direction X2 end of the battery assembly 100 along the width axis X (leftward in FIG. 3) to a positive terminal 7 of the seventh cell module 5g located on the first width direction X1 end of the battery assembly 100 along the width axis X (rightward in FIG. 3). The negative terminal 8 of the first cell module 5a (left bottom in FIG. 3) is connected with the negative terminal 62 of the cell stack 1, and the positive terminal 7 of the seventh cell module 5g (right bottom in FIG. 3) is connected with the positive terminal 66 of the cell stack 1.

Thus, the electrode part 4 electrically connected with the negative terminal 8 of the first cell module 5a corresponds to a negative electrode part of the cell stack 1. Also, the positive terminal 7 of the seventh cell module 5g corresponds to a positive electrode part of the cell stack 1. The first cell module 5a has the positive terminal 7 at an end of the first cell module 5a in a second longitudinal direction Y2 opposite from a first longitudinal direction Y1 along the longitudinal axis Y (at upward in FIG. 3). The second cell module 5b has the negative terminal 8 at an end of the second cell module 5b in the first longitudinal direction Y1. The positive terminal 7 of the first cell module 5a is electrically connected with the negative terminal 8 of the second cell module 5b through the electrode part 4 that extends along the longitudinal axis Y. Furthermore, the second cell module 5b has the positive terminal 7 at an end of the second cell module 5b in the second longitudinal direction Y2. Also, the third cell module 5c is positioned on a side of the second cell module 5b in the first width direction X1 (rightward in FIG. 3). The third cell module 5c has the negative terminal 8 at an end of the third cell module 5c in the second longitudinal direction Y2. Thus, the positive terminal 7 of the second cell module 5b is electrically connected with the negative terminal 8 of the third cell module 5c through another electrode part 4 that extends along the width axis X. The third cell module 5c has the positive terminal 7 at an end of the third cell module 5c in the first longitudinal direction Y1. The fourth cell module 5d is positioned on a side of the third cell module 5c in the first longitudinal direction Y1. Thus, the negative terminal 8 of the fourth cell module 5d is electrically connected with the positive terminal 7 of the third cell module 5c through another electrode part 4 that extends along the longitudinal axis Y. The fifth cell module 5e is positioned on a side of the fourth cell module 5d in the first width direction X1. The fifth cell module 5e is electrically connected with the fourth cell module 5d through the electrode part 4 that extends along the width axis X.

Similarly to the above, the opposite terminals (the positive terminal 7 and the negative terminal 8), which are adjacently positioned with each other, are electrically connected through the corresponding electrode part 4, and thereby the cell modules 5 are connected in series from the first cell module 5a to the seventh cell module 5g in FIG. 3. Also, the connected cell modules 5 have the tortuous shape that goes back and forth along the longitudinal axis Y. As shown in FIG. 3, the sixth cell module 5f (top right in FIG. 3) is positioned on a side of the seventh cell module 5g in the second longitudinal direction Y2. The negative terminal 8 of the seventh cell module 5g is electrically connected with the positive terminal 7 of the sixth cell module 5f through the corresponding electrode part 4. In other words, all the cell modules 5 in the casing 2 are connected in series with each other through the electrode parts 4 such that electric current flows through an electrical path that starts from the electrode part 4 of the first cell module 5a, which part 4 is positioned at the end of the first cell module 5a in the first longitudinal direction Y1, to the electrode part 4 of the seventh cell module 5g, which part 4 is positioned at the end of the seventh cell module 5g in the first longitudinal direction Y1. Accordingly, the electrical path has the tortuous shape or a zig-zag shape.

Also, cooling fins 51a to 51d are positioned above the respective electrode parts 4 such that heat of the cell modules 5 is transmitted thereto. The cooling fin 51 corresponds to any one of the cooling fins 51a to 51d. The cooling fin 51 is provided to each of the positive terminal 7 and the negative terminal 8 of the cell module 5 within the casing 2. More specifically, the cooling fins 51 are provided on a side of the positive terminal 7 and the negative terminal 8 in the first height direction Z1 along the height axis Z. The cooling fin 51 is a known corrugated fin made of, for example, aluminum alloy, and has crests and valleys alternately arranged along the width axis X. The cooling fin 51 has an elongated shape along the longitudinal axis Y such that cooling air flows between the crests and the valleys of the cooling fins 51.

The cooling fin 51 (or the downstream cooling fin 51) located downstream of the other cooling fin 51 (or the upstream cooling fin 51) in a flow direction of cooling air has a surface area greater than a surface area of the other cooling fin 51. For example, the downstream cooling fin 51 is designed such that the downstream cooling fin 51 has a heat release performance for discharging heat to the cooling air generally equivalent to a heat release performance of the upstream cooling fin 51. In other words, the cooling fin 51 positioned closer to the first end of the cell module 5 in the first longitudinal direction Y1 has the heat release capacity generally equivalent to the heat release capacity of the cooling fin 51 positioned closer to the second end of the cell module 5 in the second longitudinal direction Y2. The heat release of each cooling fin 51 to the cooling air is proportional to a product of the surface area of the cooling fin 51 multiplied by a temperature difference between the cooling fin 51 and cooling air. In general, temperature of cooling air at a downstream side is higher than temperature of cooling air at an upstream side due to heat exchange with the cooling fin 51 positioned upstream. Each cooling fin 51 is designed and configured such that the heat release from each cooling fin 51 is equivalent to each other even when heat is exchanged with the cooling air having the above increased temperature. In other words, in an assumed case, where cooling air of the same temperature passes by each cooling fin 51, the cooling fin 51a positioned closest to the first end of the cell module 5 has the smallest heat release, and each cooling fin 51 positioned closer to the second end of the cell module 5 sequentially has the larger heat release than the other.

The one side face 50 of the cell stack 1 is other than upper and lower surfaces of the casing 2, and is orthogonal to the side surface of the cell module 5, which surface extends along the longitudinal axis Y. The blowing member 30 is integrally provided adjacent to the one side face 50 of the cell stack 1. The blowing member 30 has a blow-out port 37 having a width equivalent to a dimension of the one side face 50 of the cell stack 1 along the width axis X. In other words, the width of the opening of the blow-out port 37 is generally equivalent to the length of the cell stack 1 in the longitudinal direction of the cell stack 1. Thus, the blowing member 30 supplies cooling air to the cell stack 1. The blowing member 30 includes two sirocco fans 34, the motor 31, and two casings 33. More specifically, the sirocco fan 34 is one example of a centrifugal fan, and the motor 31 rotates the sirocco fans 34. Also, the two casings 33 receive the sirocco fans 34 therein, respectively. Each casing 33 of the blowing member 30 has suction ports 38, 39 that suction air in a direction generally parallel to the one side face 50 of the cell stack 1 or along the width axis X. Also, the casing 33 has a flow channel 35 that connects the suction port 38, 39 with the blow-out port 37, and the width of the flow channel 35 measured along the width axis X becomes greater toward the blow-out port 37.

The sirocco fans 34 are fixed to the opposite ends of a rotational shaft 32 of the motor 31 that is generally horizontally provided. A shaft center of the rotational shaft 32 is positioned at a certain elevation H' from a plane of a lower surface of the cell stack 1, which surface faces downwardly in FIG. 4 or in the second height direction Z2 along the height axis Z. The certain elevation H' is smaller than a height H of the cell stack 1 along the height axis Z (see FIG. 4). Each casing 33 has a scroll member that covers the corresponding sirocco fan 34 fixedly supported by the end of the motor 31. Each casing 33 has the suction ports 38, 39 that open at opposite side surfaces of the casing 33 in the longitudinal direction of the motor 31. The casing 33 integrally has a mount leg 40 that is fixed to a vehicle component or the component receiving box through fastening means, such as a bolt.

The casing 33 has the blow-out port 37, through which air suctioned through the suction ports 38, 39 is blown toward an upper surface of the cell stack 1. An air passage is defined between an internal wall surface of the casing 33 and a forward-curved blade of the sirocco fan 34. The air passage is connected with the blow-out port 37 through a flow channel 35. The flow channel 35 is widened toward the blow-out port 37. More specifically, the width of the flow channel 35 at the blow-out port 37 measured along the width axis X is greater than the width of the flow channel 35 at the suction ports 38, 39 measured along the width axis X. Thus flared air passage is provided above the sirocco fan 34, and the blow-out port 37 is positioned to open at an upper part in the casing 2. A total dimension of the blow-out ports 37 along the width axis X is generally equal to a dimension L2 of the cell stack 1 along the width axis X. A total dimension L1 of the arrangement of the scroll members of the casings 33 measured along the width axis X (or in the longitudinal direction of the motor 31) is shorter than the dimension L2 of the cell stack 1 measured along the width axis X as shown in FIG. 1. As a result, a sufficient unoccupied space is defined between the end of the casing 33 and an imaginary plane, which is perpendicular to the one side face 50 of the cell stack 1, and which includes the longitudinal end portions 50a, 50b of the one side face 50.

Cooling air blown out of the blow-out port 37 flows toward the upper surface of the cell stack 1, and then cooling air reaches the upper surface of each cell module 5 located at the upstream and downstream sides of the cell stack 1 in a flow direction of cooling air. Thus, air blown out of the blow-out port 37 absorbs heat from the cooling fins 51. The casing 2 is provided with a discharge port 26, through which air having absorbed heat is discharged. The discharge port 26 is provided to a side surface of the casing 2, which extends along the width axis X, such that the discharge port 26 is opposed to the blow-out port 37. In other words, the discharge port 26 is provided at an part of the side surface of the casing 2, which surface is provided at the end of the casing 2 in the second longitudinal direction Y2, and which extends along the width axis X. Also, the part of the side surface of the casing 2 corresponds to the upper half of the side surface in the first height direction Z1. Typically, as shown in FIG. 4, the discharge port 26 may be provided at an elevation measured from a plane of the lower surface of the casing 2, which elevation is generally equivalent to the elevation of the blow-out port 37 and the cooling fin 51 measured from the plane.

As shown in FIG. 4, each of wiring units 55 defines an insertion space 56, through which the wiring 73 is received. For example, the wiring 73 electrically connects the control circuit unit 24 with the monitor sensor 72 for monitoring the battery condition, such as a temperature sensor. The monitor sensor 72 for monitoring the battery condition is provided to each cell module 5, and the wiring 73 that is connected with the monitor sensor 72 extends upward (in the first height direction Z1) and projects from the upper surface of each cell module 5. As a result, every cell module 5 has the wiring 73 that projects from the upper surface thereof, and thereby the wiring unit 55 leads the respective wiring 73 to extend in the second width direction X2.

The heater member 60 is provided between the cooling fin 51a and the blow-out port 37 of the blowing member 30. As shown in FIG. 3, the above cooling fin 51a is positioned at the most end of the cell modules 5 in the first longitudinal direction Y1. For example, the heater member 60 is integrally provided to the casing 33 of the blowing member 30 near the blow-out port 37. Typically, the heater member 60 is an electric device. The heater member 60 is designed to have a ventilation resistance as small as possible such that the resistance given by the heater member 60 to cooling air that passes by is minimized. For example, the heater member 60 employs a nichrome wire (high electrical resistance wire) as an electrical heating element. Thus, when the nichrome wire is energized, the electrical resistance of the nichrome wire causes heat generation, and thereby the heater member 60 heats the cooling air by using the generated heat.

The above control component is provided between the casing 33 and the imaginary plane, which is perpendicular to the width axis X, and which includes the longitudinal end portion 50a, 50b of the one side face 50 of the cell stack 1. Also, the control component may be alternatively provided between the suction port 38, 39 and the above imaginary plane. In other words, the control component is located within a space that is defined by the height H of the cell stack 1, the length L2 of the cell stack 1, and a length L3 of the blowing member 30 (see FIG. 1). Thus, the above defined space has a rectangular parallelepiped shape. More specifically, the height H is a dimension of the cell stack 1 measured along the height axis Z or in the up-down direction. The length L2 is a dimension of the cell stack 1 measured along the width axis X. The length L3 is a dimension of the blowing member 30 measured along the longitudinal axis Y or in the longitudinal direction of the cell modules 5. As above, if the blowing member 30 does not occupy the above defined space, the unoccupied space is a dead space. Thus, the control component is provided in order to effectively utilize the unoccupied space. In the present embodiment, the control component is provided within the above space having the rectangular parallelepiped shape, and thereby the control component is limited from projecting outwardly from the rectangular parallelepiped, and thereby the entirety of the battery assembly 100 is effectively reduced in size. Therefore, it is possible to facilitate the mounting of the battery assembly in the vehicle.

Furthermore, the control component includes the relay unit 63 and the relay unit 68, for example. One of the relay units 63, 68 is provided adjacent to the corresponding one of the positive terminal 66 and the negative terminal 62 that are provided to the one side face 50 of the cell stack 1. The relay unit 63, 68 is spaced apart from the suction port 38 by a predetermined clearance. Also, the relay unit 63, 68 is provided in a space defined by projecting the casing 33 in the direction of the width axis X, and a half or more of the volume of the relay unit is included in the defined space. Because there is the above physical relation between the relay unit and the casing 33, the relay unit is limited from generating the resistance applied to air that is to be suctioned by the fan. Thus, the relay unit of the present embodiment is located in the unoccupied space that otherwise becomes the dead space, and as a result, the unoccupied space is effectively used. Due to the above arrangement, it is possible to determine the arrangement of the relay unit in consideration of the cooling performance for cooling the battery (cell modules) by using the blowing member 30, and still it is possible to reduce the entirety of the battery assembly 100 in size. As a result, it is possible to more effectively mount the assembly 100 in the vehicle by the integral arrangement of the components, which arrangement maximizes the use of the dead space.

Figure 5:
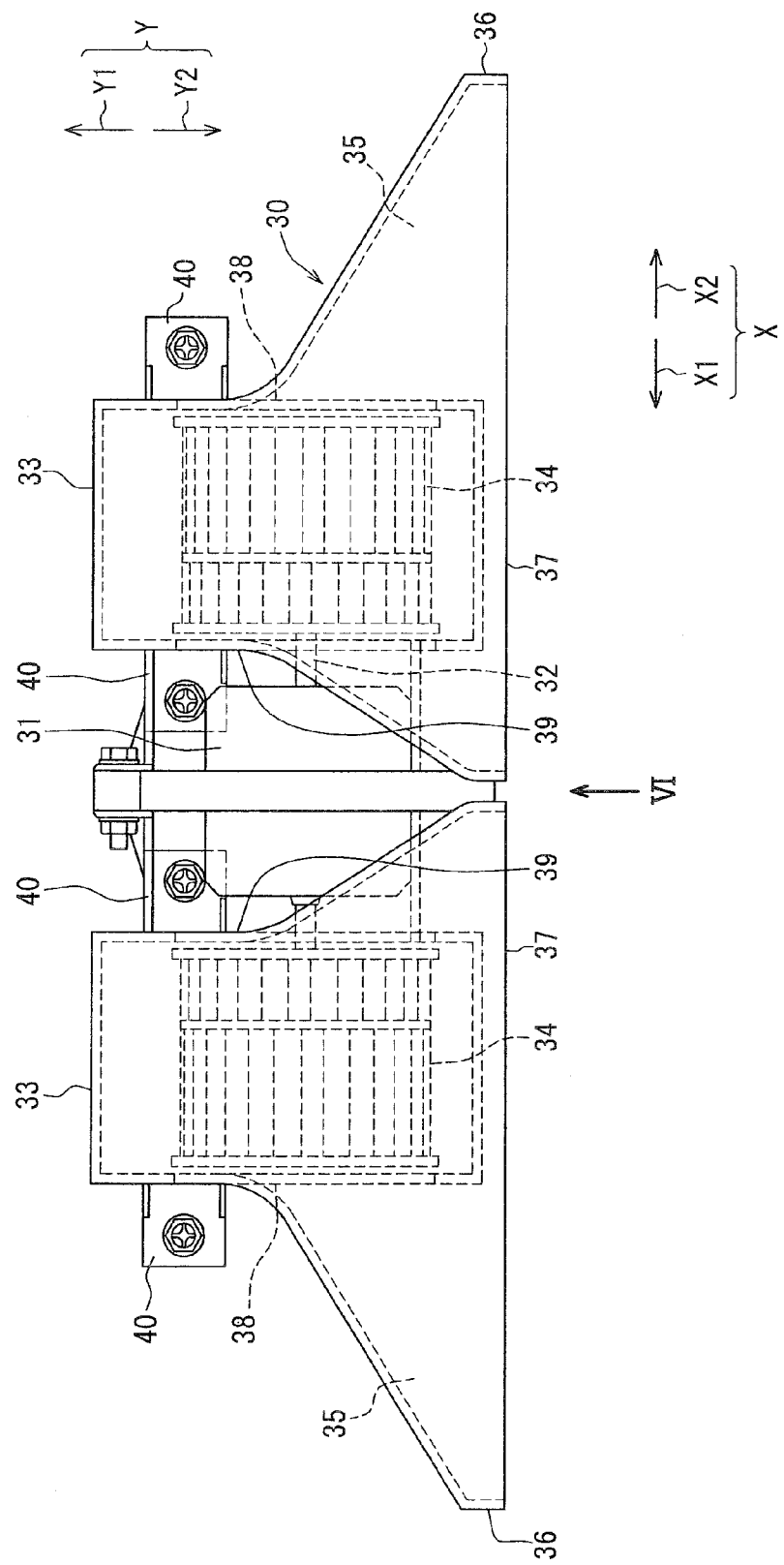
FIG. 5 is a plan view illustrating the configuration of a blowing member of the on-board battery assembly.
Figure 6:
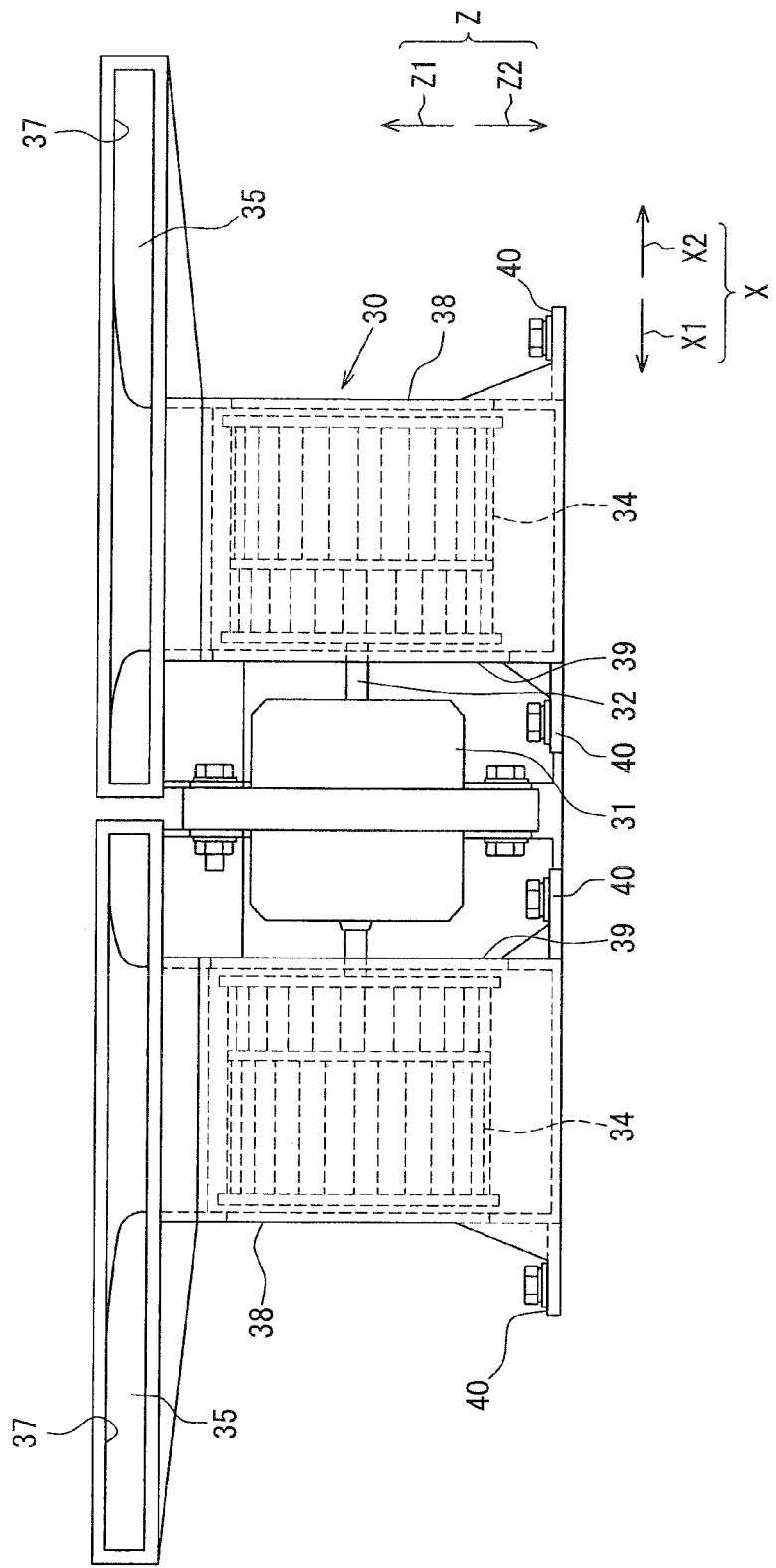
FIG. 6 is a front view observed in a direction VI of FIG. 5 for illustrating a configuration of the blowing member.

Next, the configuration of the blowing member 30 will be described with reference to FIG. 5 and FIG. 6. FIG. 5 is a plan view illustrating the configuration of the blowing member 30 of the on-board battery assembly 100. FIG. 6 is a front view illustrating the blowing member 30 observed in a direction VI of FIG. 5. As shown in FIG. 5, the casing 33 has a flared part and a tubular part 36. The flared part has the width that gradually increases toward the blow-out port 37 from positions around the opposite longitudinal ends of the centrifugal fan 34 outwardly along the width axis X. Also, the flared part extends toward the blow-out port 37. The tubular part 36 extends from the end of the flared part toward the blow-out port 37 (or in the second longitudinal direction Y2) with the fixed width. As a result, the flow channel 35 having the flared shape toward the blow-out port 37 is formed by the flared part, and thereby air is delivered to the blow-out port 37 uniformly in the width direction of the casing 2. Also, it is possible to reduce a dimension of the casing 33 measured along the height axis Z or in the up-down direction in FIG. 6.

Also, a pair of the casings 33 are located on both sides of the motor 31 in the blowing member 30. The flared part of one of the casings 33 expands more greatly in a direction away from the other one of the casings 33 than in a direction toward the other one (see FIG. 5). Thus, for example, the casing 33 on the left in FIG. 5 expands more in an outer direction (the first width direction X1) than in a direction (the second width direction X2) toward a center defined between the casings 33 or toward the other casing 33 positioned on the right in FIG. 5. For example, a center of each casing 33 is defined in a middle of the casing 33 along the width axis X. In the above case, each sirocco fan 34 is positioned closer to the motor 31 relative to the center of the respective casing 33 as shown in FIG. 5. Accordingly, the casing 33 has the shape such that the scroll member is positioned closer a center line of the cell stack 1, which line extends from a width center of the cell stack 1 in a direction of the longitudinal axis Y. Thus, a center of mass of the casing 33 is biased toward the center line of the cell stack 1. Thereby, it is possible to form the unoccupied space around a side of the both end portions of the one side face 50 of the cell stack 1 at along the width axis X.

The blow-out port 37 provided at the end of the tubular part 36 has a flat opening shape that has a dimension along the height axis Z (up-down dimension in FIG. 6) smaller than a dimension along the width axis X (left-right dimension in FIG. 6). As shown in FIG. 5, a sum of the widths of the two blow-out ports 37 arranged in the longitudinal direction of the rotational shaft 32 is generally equivalent to the width of the cell stack 1 measured along the width axis X or a lamination direction of the cell modules 5, in which the cell modules 5 are stacked onto one another. The blow-out port 37 is positioned above the sirocco fan 34 and opens at a position closer to the cell stack 1 than the sirocco fan 34. The casing 33 has the flared part having a shape that swells in a longitudinal direction of the sirocco fan 34 and also extends toward the cell stack 1 from above the sirocco fan 34. Also, the casing 33 reaches the blow-out port 37 through the tubular part 36.

Cooling air blown by the above blow-out port 37 forms a flow, which has a relatively high flow rate and high static pressure, to the upper surface of the cell stack 1. Because the casing 33 has the flared part and the blow-out port 37, it is possible to supply cooling air, which has low noise, to the narrow flow channels that are formed in the downsized casing 33 and in the casing 2. Also, cooling air suctioned through the suction ports 38, 39 is blown out of the blow-out port 37 via the flow channel 35 within the casing 33, which channel 35 has the width becoming greater toward the blow-out port 37. The blow-out port 37 opens at the upper part of the casing 2, and has an opening that has a transverse dimension measured along the width axis X, which dimension is generally equivalent to the width of the cell stack 1. As a result, it is possible to distribute cooling air all around the upper part within the casing 2.

Advantages of the on-board battery assembly 100 of the present embodiment will be described. The on-board battery assembly 100 includes the cell stack 1, the blowing member 30, and the relay units 63, 68. The cell stack 1 is made of the multiple cell modules 5. The blowing member 30 is provided adjacent to the one side face 50 of the cell stack 1 such that the blowing member 30 supplies the cooling air to the cell stack 1. The one side face 50 is orthogonal to the side surface of the cell module 5 that extends in the longitudinal direction of the cell module 5. The blowing member 30 has the blow-out port 37 that has the dimension equivalent to the width of the one side face 50 of the cell stack 1 measured in the longitudinal direction of the side face 50. The relay units 63, 68 is electrically connected with the multiple cell modules 5 and controls energization to the cell stack 1. The blowing member 30 has the casing 33 that is provided with the suction ports 38, 39 and the flow channel 35. Air is suctioned through the suction port 38, 39 in a direction generally parallel to the one side face 50 of the cell stack 1. The flow channel 35 connects the suction ports 38, 39 with the blow-out port 37. The flow channel 35 is defined within the blowing member 30 and has the width at the blow-out port 37 greater than the width at the suction ports 38, 39. Thus, the width of the flow channel 35 becomes greater toward the blow-out port 37. The relay units 63, 68 are provided in a space between the casing 33 and the plane, which is perpendicular to the one side face 50 of the cell stack 1, and which includes the longitudinal end portions 50a, 50b of the one side face 50 of the cell stack 1.

Because the casing 33 has the flow channel 35 having the above flared shape, the blowing member 30 is narrowed toward the suction ports 38, 39 from the blow-out port 37, and thereby it is possible to provide a wide unoccupied space on a side of the casing 33 along the width axis X. As a result, the space occupied by the blowing member 30, which is provided adjacent to the one side face 50 of the cell stack 1, is reduced, and thereby it is possible to obtain a larger dead space beside the one side face 50 of the cell stack 1 accordingly. Thus, the control component is positioned in the space positioned beside the casing 33 such that the control component is limited from projecting from the plane, which is perpendicular to the one side face 50, and which includes the longitudinal end portions 50a, 50b of the one side face 50. As a result, the control component is provided within a generally rectangular parallelepiped space that includes the cell stack 1 and the blowing member 30. In other words, the control component is limited from projecting from the rectangular parallelepiped space, and thereby it is possible to more easily mount the downsized assembly in the vehicle. Due to the above configuration, it is possible to effectively mount the control component by effectively utilizing the dead space defined due to the difference in sizes and shapes between the cell stack 1 and the blowing member 30. For example, in the present embodiment, the casing 33 has a characteristic shape of the flared part in order to maximize the use of the dead space.

Also, because the blowing member 30 has the flow channel 35 having the flared shape, the blowing member 30 is capable of distributing cooling air, which has the uniform velocity distribution, to the cell stack 1. Also, due to the above, it is possible to reduce the blowing member 30 in size, and thereby obtaining the unoccupied space.

Furthermore, the blowing member 30 is provided with the centrifugal fan in addition to the flow channel 35 having the flared shape. As a result, the blowing member 30 is capable of supplying cooling air having high static pressure. Accordingly, the blowing member 30 serves as a cooling apparatus that makes substantially lower noise and consumes substantially lower energy even when the blowing member 30 supplies air to the narrow flow channel, which is narrowed as a result of the downsizing of the blowing member 30.

Furthermore, because the blow-out port 37 is a flat opening, it is possible to blow cooling air through the blow-out port 37 at a relatively high velocity of flow even for a small amount of flow. Thus, it is possible to achieve sufficient cooling performance for cooling the cell modules 5 while low noise is generated.

Also, the control component may be the relay unit 63, 68 that is connected with at least one of the positive terminal 66 and the negative terminal 62 of the cell stack 1 such that the relay unit 63, 68 is capable of allowing and prohibiting the electric power supply from the cell stack 1.

In a case, where the above configuration is applied, it is possible to mount a large-sized relay unit, which serves as a system main relay adapted to control a large electric current supplied from the cell stack, by maximizing the use of the unoccupied space located on a side of the cell stack 1 in the direction of the longitudinal axis (Y). For example, in the present embodiment, the above unoccupied space has the depth of L3, the height of H, and the width of L2 at most as shown in FIG. 1. Furthermore, because it is possible to obtain the large unoccupied space for mounting the relay unit, it is possible to improve the flexibility in designing the wiring related to the relay unit.

Also, the control component may be the control circuit unit 24, which is adapted to monitor at least a voltage and a temperature of the cell stack 1, and which is adapted to control the operation of the blowing member 30. Also in a case, where the above configuration is applied, it is possible to mount the control circuit unit 24 by maximizing the use of the unoccupied space which is located on the side of the cell stack 1 in the direction of the longitudinal axis (Y). The above unoccupied space is defined by the depth of L3, the height of H, and the width of L2. Furthermore, because it is possible to design the shape of the control circuit unit 24 in order to maximize the use of the unoccupied space, it is possible to further reduce the size of the on-board battery assembly 100.

Also, the control component, such as the control circuit unit 24, may be provided below the blowing member 30. In a case, where the above configuration is applied, the unoccupied space located below the blowing member 30 is also used as the space, in which the control component is mounted. As a result, if the blowing member 30 has the dimension measured along the height axis Z, which is smaller than the transverse dimension of the one side face 50 of the cell stack 1 measured along the height axis Z, the size of the entirety of the assembly 100 is more effectively reduced. Also, it is possible to stably mount the apparatus in the vehicle. Thus, it is possible to provide the on-board battery assembly that is substantially effectively mountable in the vehicle.

Also, the on-board battery assembly 100 further has the heater member 60 mounted in the passage, through which cooling air supplied by the blowing member 30 flows. The control component includes the heater control circuit 61 that controls the electric power supplied to the heater member 60. Due to the above configuration, the on-board battery assembly 100 is also provided with the temperature-raising function for heating the blown air. By mounting the heater control circuit 61 in the unoccupied space, it is possible to obtain the on-board battery assembly 100 that obtains the controlability of the temperature of the cell stack 1 and the downsizing of the apparatus.

Other Embodiment

The present invention not limited to the above described embodiment. However, the present invention may be modified in various manner provided that the present invention does not deviate from the scope and sprit of the present invention.

For example, in the above embodiment, the on-board battery assembly 100 is designed such that the rotational shaft 32 of the fan extends in the horizontal direction. The arrangement of the above embodiment is suitable for a case, where the mounting space has a smaller dimension measured along the height axis Z, and thereby the height axis Z extends in an up-down direction (vertical direction). Alternatively, the rotational shaft 32 of the fan may extends in the vertical direction. Also, the battery assembly 100 is placed such that the longitudinal axis Y may extend in the up-down direction. In the above case, although the rotational shaft 32 of the fan extends in the horizontal direction, the blow-out port 37 opens upward such that the air flows upwardly. The alternative arrangements are suitable for another case, where the mounting space has a smaller dimension measured along the width axis X.

Also, in the above embodiment, the side surfaces, which extend along the longitudinal axis Y, of the multiple cell modules 5 are in contact with each other. Alternatively, the multiple cell modules 5 may be arranged separate from each other along the width axis X (in the direction of the width axis X) by a predetermined clearance. In other words, the multiple cell modules 5 may be apart from each other in a direction perpendicular to the flow direction of the cooling air supplied by the blowing member 30 in the casing 2. In the above alternative case, the cooling air flows into the clearances defined between the side surfaces of the cell modules 5, and flows toward the discharge port of the casing 2. Then, the cooling air is capable of absorbing heat of each cell module 5 before being discharged through the discharge port of the casing 2. Thus, it is possible to more efficiently control the temperature of the cell modules 5.

Additional advantages and modifications will readily occur to those skilled in the art. The invention in its broader terms is therefore not limited to the specific details, representative apparatus, and illustrative examples shown and described.

What is claimed is:

1. An on-board battery assembly comprising:
a cell stack that includes a plurality of cell modules, which are electrically connected in series with each other, wherein:
   each of the plurality of cell modules has a side surface that extends along a longitudinal axis of each of the plurality of cell modules, the plurality of cell modules being integrally arranged such that the side surfaces of the plurality of cell modules are opposed to each other along a width axis that is orthogonal to the longitudinal axis; and
   the cell stack has one side face that extends generally along the width axis;
a blowing member that is provided adjacent the one side face of the cell stack, the blowing member having a blow-out port that has a dimension generally equivalent to a dimension of the one side face of the cell stack measured along the width axis, the blowing member supplying cooling air to the cell stack through the blow-out port; and
a first relay unit and a second relay unit, the first and second relay units being electrically connected with the plurality of cell modules and being adapted to control electric power supply from the cell stack, wherein:
each of the relay units is connected with at least one of a positive terminal and a negative terminal of the cell stack;
each of the relay units allows and prohibits the electric power supply from the cell stack;
the blowing member includes a casing that has:
   a suction port adapted to suction air generally in a direction of the width axis; and
   a flow channel defined within the casing, the flow channel connecting the suction port with the blow-out port, the flow channel has a dimension along the width axis, which becomes greater toward the blow-out port;
each of the relay units is located on one side of the one side face of the cell stack, at which the blowing member is located;
at least one of the relay units is placed within a longitudinal extent of the one side face of the cell stack in a direction parallel to the width axis;
the first relay unit is collinear with the second relay unit; and
the blowing member is disposed in a space between the first relay unit and the second relay unit along the width direction.

2. The on-board battery assembly according to claim 1, wherein:
the blowing member has a centrifugal fan positioned within the casing, the centrifugal fan having a rotational shaft that extends generally along the width axis;
the positive terminal and the negative terminal are provided on a side of the one side face of the cell stack;
at least one of the relay units is provided adjacent to the at least one of the positive terminal and the negative terminal;
at least one of the relay units is spaced from the suction port by a predetermined clearance; and
at least one of the relay units is in a space defined by projecting the casing in the direction of the width axis, the defined space including therein a half or more of a volume of the at least one relay unit.

3. The on-board battery assembly according to claim 1, wherein:
at least one of the relay units is provided below the blowing member.

4. The on-board battery assembly according to claim 1, wherein the cell stack, the blowing member and at least one of the relay units are integrally held together.

5. The on-board battery assembly according to claim 1, wherein at one of the relay units is placed within an extent of a height of the cell stack, which is measured in a direction perpendicular to the plane.

6. The on-board battery assembly according to claim 1, wherein at least one of the relay units is adapted to control the electric power supply, which is provided from the cell stack and is outputted externally out of the on-board battery assembly through a terminal of the on-board battery assembly after being controlled by the relay unit.

7. The on-board battery assembly according to claim 1, wherein at least one of the relay units is fully provided within a rectangular parallelepiped space, wherein the at least one relay unit is limited from projecting outwardly from the rectangular parallelepiped space.

* * * * *